United States Patent [19]

Raleigh et al.

[11] 4,361,274
[45] Nov. 30, 1982

[54] ELECTRONIC TEMPERATURE CONTROL

[75] Inventors: William F. Raleigh, Valencia; Patrick J. Keegan, Sepulveda, both of Calif.

[73] Assignee: Teledyne Industries, Inc., Los Angeles, Calif.

[21] Appl. No.: 184,638

[22] Filed: Sep. 8, 1980

[51] Int. Cl.³ .......................... F22B 37/42; H05B 1/02
[52] U.S. Cl. .................................. 236/21 B; 219/505; 236/91 G; 323/366
[58] Field of Search ................ 236/91G, 47, 78 R, 20, 236/21 R, 21 B; 323/366; 219/505

[56] References Cited

U.S. PATENT DOCUMENTS

| | | | |
|---|---|---|---|
| 2,138,593 | 11/1938 | Breitenstein | 236/69 |
| 2,932,784 | 4/1960 | Hampton | 323/366 |
| 3,275,802 | 9/1966 | Vandivere et al. | 219/505 X |
| 3,456,455 | 7/1969 | Sapir | 236/78 X |
| 3,819,905 | 6/1974 | Trostler | 219/505 X |
| 3,843,049 | 10/1974 | Baysinger | 236/20 X |

Primary Examiner—William E. Wayner
Attorney, Agent, or Firm—Reagin & King

[57] ABSTRACT

An electronic temperature control circuit is disclosed for use with swimming pool and spa heaters. The circuit employs a thermistor for sensing water temperature, and provides temperature control with a narrow differential. Safety circuits are also employed to prevent injury to the user or to the heater in the event of a component failure. The temperature control circuit is provided with means for presetting two desired temperature settings and for selecting one of the preset temperature settings for control. Remote control circuits are also disclosed for use with the temperature control circuit which permit temperature selection, temperature setting and a visual indication of heater status from a location remote from the heater.

2 Claims, 5 Drawing Figures

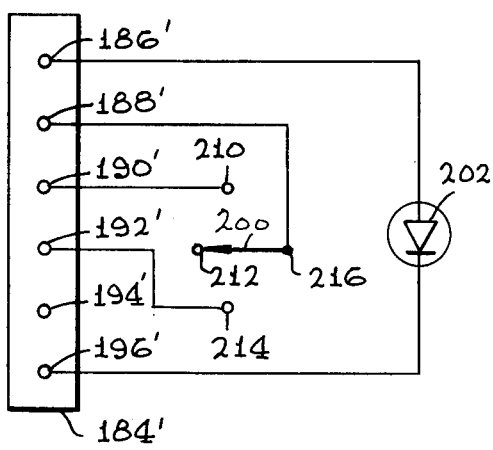
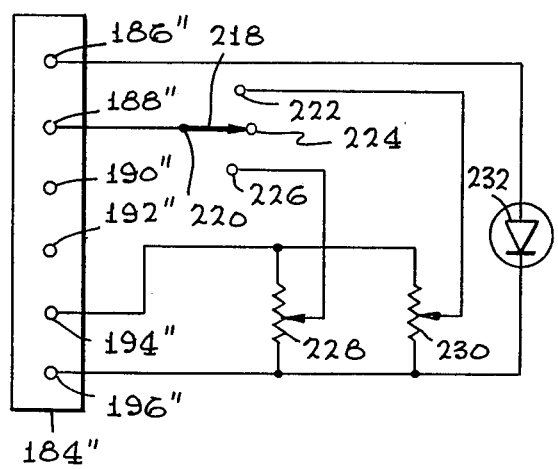
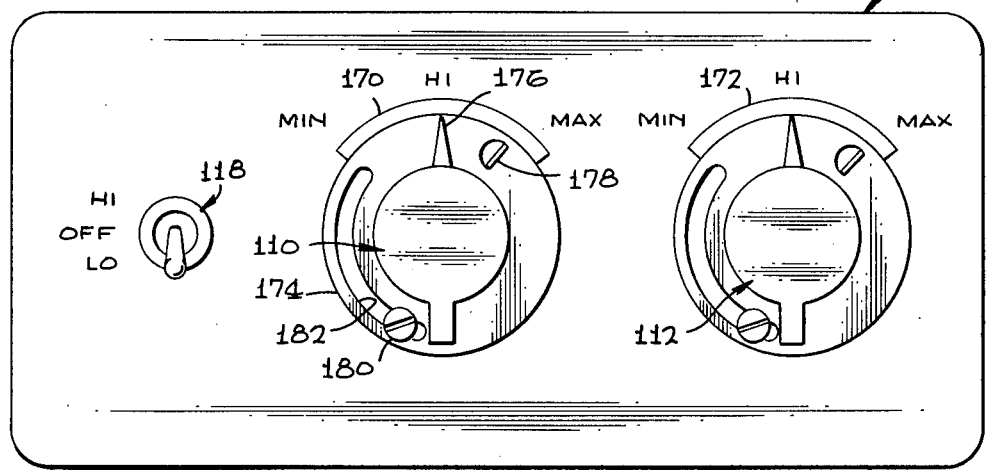
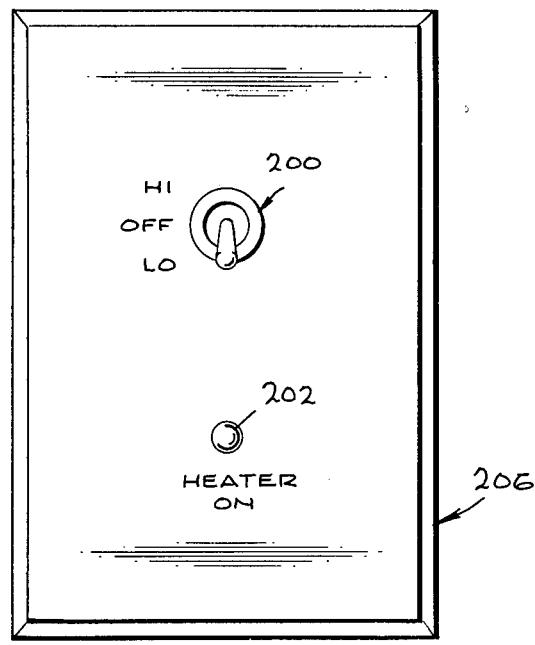

ELECTRONIC TEMPERATURE CONTROL

BACKGROUND OF THE INVENTION

This invention relates to electronic temperature controls and, more particularly, to electronic temperature controls for use with swimming pool and spa heaters.

Temperature controls employing mechanical control means have been used for many years to control the water temperature in swimming pool and spa heaters. A typical mechanical control employs a sealed temperature sensing metal bulb which is filled with a thermally expansive liquid. This bulb is connected to the actuating diaphragm of a pressure operated electrical switch through a metal capillary tube. The electrical switch in turn is connected to operate a heater controller such as an electric gas valve. In operation, the metal bulb is placed in close thermal contact with the water entering the heater. As the water temperature is increased by the heater, the fluid within the metal bulb expands in the capillary tube, exerting a pressure on the diaphragm of the electrical switch which is proportional to water temperature. The diaphragm in turn is biased against the capillary pressure by a spring. The spring force is adjusted by rotating a temperature control knob which serves as the temperature setting means. When the force of the expanding liquid exceeds the spring force, the diaphragm actuates the electrical switch which deenergizes the heater. Subsequent cooling of the water reduces the capillary pressure, thus deactivating the electrical switch, reenergizing the heater. Adjustment of the temperature control knob varies the spring force and thus sets the water temperature at which the heater will cycle on and off.

Although these and other types of temperature controls which employ mechanical control means have gained widespread use, they possess several limitations. For example, these controls possess a wide differential between the temperature at which the heater is turned on and the temperature at which the heater is turned off. This differential, or hysteresis, is largely caused by the backlash and the friction inherent in mechanically coupled systems. A wide differential in temperature results in user dissatisfaction because of the poor repeatability of temperature settings. This also results in energy waste since the user will typically increase the temperature setting in an effort to overcome the effect of the wide differential on the pool water temperature.

Another limitation of the prior art mechanical controls is their tendency to fail in a mode which results in an unsafe heater condition. A typical failure mode for these controls is a leak in the sensing bulb or capillary tube, with resultant loss of fluid pressure. This type of failure causes the heater to be energized continuously, which may damage the heater and may expose the user to dangerously high swimming pool and spa water temperatures. To overcome these problems, a separate high temperature sensor and safety switch is usually employed in prior art controls to deenergize the heater when water temperature rises above a preset maximum limit.

A further limitation of prior art controls is that they are not easily adapted for dual temperature control. Typically it is desirable for the user to be able to preset two different temperature settings for the heater, such as a high temperature mode for the spa, and a low temperature mode for the pool, with means for selecting the desired mode. With only a single temperature setting control, the user must adjust the control knob from one setting to the other to change modes. This results in poor temperature repeatability due to the wide control differential as described heretofore. Alternatively, two entirely separate controls may be employed, which requires duplicating the sensing bulbs, capillary tubes, diaphragms and pressure operated switches. A separate electrical switch is then employed to select the desired mode by connecting the appropriate pressure operated switch to the heater controller circuit. This duplication of control systems is expensive and cumbersome.

Still another limitation of prior art controls is that they are not easily adapted for use in remote control applications. In many instances it is desirable to control the heater temperature from locations other than the heater itself. For example, the heater may be located in an equipment area remote from the pool or spa, while the user may wish to control water temperature at a location adjacent to the swimming pool. The temperature sensing bulb in the prior art controls is typically mounted in the inlet water line of the heater, since this location closely approximates the spa or pool water temperature. Because the sensing bulb is connected to the temperature setting means by the metal capillary tube, the location of the setting means is restricted to the vicinity of the heater, precluding remote control.

It is therefore an object of the present invention to provide a new and improved temperature control for use in swimming pool and spa heaters.

It is another object of the present invention to provide a narrow differential temperature control for swimming pool heaters.

It is another object of the present invention to provide a swimming pool heater temperature control employing safety circuits to prevent injury to the user or to the heater in the event of a component failure.

It is another object of the present invention to provide a swimming pool heater temperature control easily adapted for use with multiple preset temperature settings.

It is still another object of the present invention to provide a swimming pool heater temperature control easily adapted for remote control of swimming pool and spa heaters.

SUMMARY OF THE INVENTION

The foregoing and other objects of the invention are accomplished by an electronic temperature control circuit which employs a thermistor for sensing water temperature entering the pool heater. The control circuit employs amplifiers to permit controlling the heater to maintain essentially constant water temperature within a very narrow differential. Two desired temperatures may be preset by either of two calibrated potentiometers. A three-position temperature selector switch is employed to select from either of the two preset potentiometers. The third position of the switch is used to turn the heater off.

The control circuit is configured to permit connection of a second set of temperature setting and selection controls which may be located remotely from the heater. Thus a second three-position temperature selector switch and a second set of temperature setting potentiometers may be used for remote control of the heater. Means are also provided for visual indication of heater operation by use of an indicator lamp.

The electronic temperature control of the present invention further includes safety circuits which limit the water temperature to a predetermined maximum allowable temperature, regardless of the settings of the temperature selector switch or the temperature setting potentiometers.

Additional safety circuits are employed to turn off the heater in the event of a failure of the thermistor temperature sensor.

Other objects, features and advantages of the invention will become apparent by reference to the specification taken in conjunction with the drawings in which like elements are referred to by like reference designations throughout the several views.

BRIEF DESCRIPTION OF THE DRAWINGS

FIG. 2 is a circuit diagram of a remote control temperature selector circuit which may be used in conjunction with the invention as shown in FIG. 1;

FIG. 3 is a circuit diagram of a remote control temperature setting and selector circuit which may be used in conjunction with the invention as shown in FIG. 1;

FIG. 4 is a front view of a control panel which may be used in conjunction with the invention as shown in FIG. 1; and FIG. 5 is a front view of a remote control panel which may be used in conjunction with the circuit as shown in FIG. 2.

DESCRIPTION OF THE PREFERRED EMBODIMENT

Figure 1:
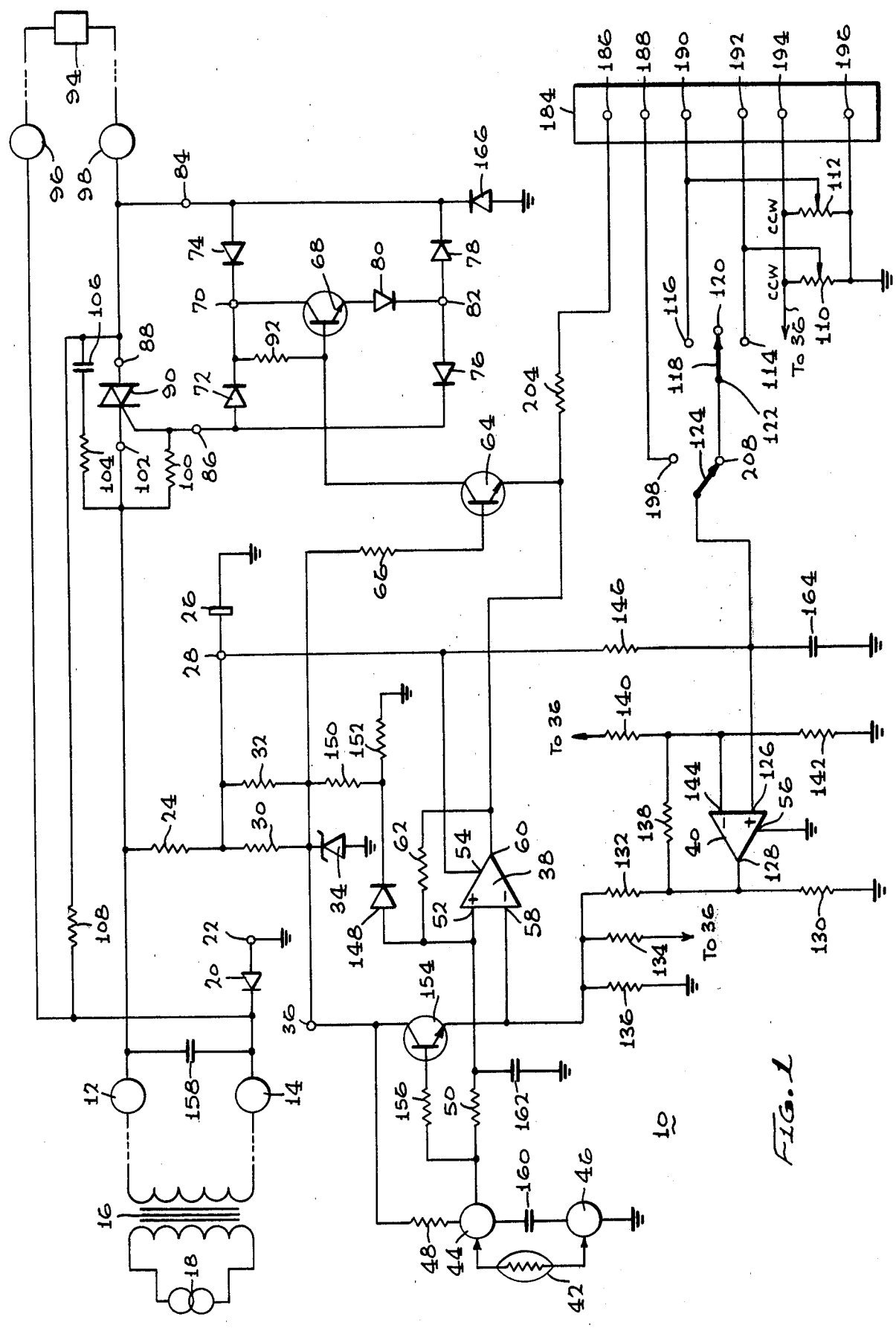
FIG. 1 is a circuit diagram of the electronic temperature control circuit constructed in accordance with the invention.

Referring to FIG. 1 there is shown an electronic temperature control circuit 10 constructed in accordance with the invention. The circuit receives its power from an input voltage source connected at terminals 12 and 14. Typically, this power source is derived from a step-down transformer 16 which converts a conventional AC power source 18 to a low voltage level, typically 24 volts AC, which appears at terminals 12 and 14. This low voltage AC source is half wave rectified by a diode 20 connected as shown between terminal 14 and a ground terminal 22 and is further filtered by the RC network comprised of resistor 24 and capacitor 26. The components of this filter network are chosen so that a first DC supply voltage appears at terminal 28 and is typically twelve volts. This first DC supply voltage is further reduced and regulated by a parallel combination of resistors 30 and 32 and by a zener voltage regulator 34, creating a second regulated DC supply voltage at terminal 36 which is typically six volts. The first supply voltage at the terminal 28 is used to power operational amplifiers 38 and 40 of the circuit 10. The second supply voltage at the terminal 36 is used to power sensor and bias networks of the circuit 10.

The control circuit 10 uses a bead thermistor 42 as the water temperature sensing element. The thermistor 42 is housed in a suitable waterproof enclosure which is placed in the water inlet line of the swimming pool or spa heater. This position is chosen for the sensor 42 because the heater inlet water temperature is a close approximation of the swimming pool or spa water temperature. The thermistor 42 is a conventional negative temperature coefficient resistor whereby its resistance decreases as its temperature increases. The sensor 42 typically has a 10 kilohm resistance value at a temperature of 77° F. (25° C.) and a 3.6 kilohm resistance value at a temperature of 122° F. (50° C.). The thermistor 42 is connected to the circuit 10 at terminals 44 and 46. In this position it is connected in series with a resistor 48 to form a voltage divider which is in turn connected to the six volt regulated supply. As a result of the voltage divider circuit, the voltage appearing at the terminal 44 varies with the temperature of the sensor 42 in a relatively linear fashion over the temperature range of interest for swimming pool and spa heaters, typically between 68° F. (20° C.) and 113° F. (45° C.). The voltage at the terminal 44 decreases as the sensor 42 temperature increases.

The voltage at the terminal 44 is connected through a series resistor 50 to the noninverting input terminal 52 of the operational amplifier 38. The amplifier 38 represents one-half of a dual operational amplifier integrated circuit which includes the amplifier 38 and amplifier 40. These amplifiers receive their power and ground return from the twelve volt supply through terminals 54 and 56. When the voltage at the noninverting input terminal 52 exceeds the voltage of the inverting input terminal 58 of the amplifier 38, the voltage at the output terminal 60 of the amplifier 38 increases toward the positive supply voltage. Resistor 62 connected between the output terminal 60 and the noninverting input terminal 52 of the amplifier 38 acts as regenerative positive feedback to insure that the output 60 increases to the positive output extreme of the amplifier 38, which is approximately ten volts.

The output terminal 60 is also connected to the emitter of an NPN transistor 64. The base of transistor 64 is connected to the six volt supply through a resistor 66. When the signal at the output terminal 60 of the amplifier 38 is at its positive extreme, the base-emitter junction of the transistor 64 is reverse biased and transistor 64 is cut off.

The collector of transistor 64 is connected to the base of an NPN transistor 68. The collector of transistor 68 is in turn connected to the positive terminal 70 of a full wave bridge rectifier consisting of diodes 72, 74, 76, and 78. The emitter of transistor 68 is connected by a diode 80 to the negative terminal 82 of the full wave bridge rectifier. The input terminals 84 and 86 of the full wave bridge rectifier are connected between the main terminal 88 and the gate of a TRIAC 90.

Transistor 68 is biased to the conducting state by a resistor 92 connected between the collector and the base of transistor 68. The conduction of transistor 68 provides a low impedance path between the input terminals 84 and 86 of the full wave bridge rectifier, providing gate bias to the TRIAC 90 and causing it to conduct. The TRIAC 90 is connected in series between the twenty four volt AC input voltage source appearing at the terminals 12 and 14 and a load 94 which is connected at terminals 96 and 98. Therefore, conduction of the TRIAC 90 applies twenty-four volts AC to the load 94. The load 94 represents a typical heater controller for operating swimming pool and spa heaters such as an electrically operated gas valve for controlling a gas fired heater.

The operation of the circuits discussed thus far may be summarized as follows. When inverting input terminal 58 is more positive than noninverting input terminal 52 of amplifier 38, the amplifier output terminal 60 switches to a minimum output voltage level of approximately one-half volt. This causes the base-emitter junction of transistor 64 to be forward biased through the resistor 66, causing transistor 64 to conduct. This conduction in turn biases the base voltage of transistor 68 to a level approximately one volt above ground terminal 22. This voltage level, aided by the DC offset voltage produced at the emitter of transistor 68 by the forward voltage of the diode 80, ensures that the base-emitter junction of transistor 68 is reverse biased. Transistor 68 is thus turned off, eliminating current flow through the full wave bridge, and causing TRIAC 90 to remain in the nonconducting state. Accordingly the heater controller 94, and thus the heater, is deenergized.

The resistor 100 connected between the gate and the main terminal 102 of the TRIAC 90 provides a path for leakage currents to bypass the TRIAC 90 gate. Resistor 104 and capacitor 106 form a conventional RC snubber network across the TRIAC 90 to minimize transient induced false triggering. A resistor 108 is connected in parallel with the load 94 to bypass a portion of the leakage current produced by the RC snubber network components 104 and 106, and which would otherwise flow through the load 94 when the TRIAC 90 is nonconducting.

Returning to the amplifier 38, when the noninverting input terminal 52 of amplifier 38 is more positive than the inverting input terminal 58, the amplifier output terminal 60 switches to the positive voltage extreme of approximately ten volts, turning off transistor 64 and thereby permitting transistor 68 to conduct. This causes current flow through the full wave bridge rectifier terminals 84 and 86 and switches TRIAC 90 into conduction. Accordingly, the heater controller 94 is energized, turning the heater on. From the foregoing discussion it is seen that the voltage differential at the input terminals 52 and 58 of the amplifier 38 controls the condition of the heater.

Circuit 10 also includes two temperature setting potentiometers 110 and 112. Each of these potentiometers is connected in parallel across the six volt DC supply in such a manner that full counter clockwise rotation of the potentiometer shaft corresponds to a six volt output level appearing at the wiper of the potentiometer. This position of the shaft also corresponds to the minimum heater temperature setting point. Conversely, full clockwise shaft rotation corresponds to zero volts output and to the maximum temperature setting. The potentiometers 110 and 112 are constructed with mechanical stops at each extreme of shaft rotation to prevent the wiper from disengaging from the resistance element, a condition which would produce erratic temperature settings.

The wipers of the potentiometers 110 and 112 are connected to the contacts 114 and 116 respectively of a three position temperature selector switch 118. Switch 118 is used to select the signal from either potentiometer 110 or 112 for temperature control. Thus in position 116 the switch 118 selects the temperature as set on potentiometer 112, and in position 114, the switch 118 selects the temperature setting on potentiometer 110 for heater temperature control. The center position 120 of switch 118 represents a heater "off" position.

The signal selected by the switch 118 appears at switch terminal 122 and is connected through a switch 124 to the noninverting input terminal 126 of operational amplifier 40. The output terminal 128 of amplifier 40 is connected to the inverting input terminal 58 of amplifier 38 through an impedance matching and bias network comprising a shunt resistor 130, a series resistor 132 and a voltage divider comprising resistors 134 and 136. The values for this resistor network 130, 132, 134, and 136 are chosen so that when the voltage at output terminal 128 of amplifier 40 is at zero volts, the voltage appearing at the inverting input terminal 58 of amplifier 38 is equal in value to the voltage appearing at the noninverting input terminal 52 of amplifier 38 when the sensor 42 is at a temperature of 107° F. (41.7° C.). Similarly, when the voltage at output terminal 128 of amplifier 40 is at six volts, the values of the resistor network 130, 132, 134, and 136 produce a voltage at the inverting input terminal 58 of amplifier 38 that corresponds to the voltage appearing at the noninverting input terminal 52 when sensor 42 is at a temperature of 70° F. (21.1° C.).

The output voltage from the wiper of one of the potentiometers 110 or 112 is selected by switch 118 and applied to the noninverting input terminal 126 of amplifier 40. The gain and offset voltage of amplifier 40 are determined respectively by the values of the resistor 138 and the voltage divider comprising resistors 140 and 142 connected to the inverting input terminal 144 of amplifier 40. The values of the resistors 138, 140, and 142 are chosen so that full counter clockwise rotation of the shaft of the selected potentiometer, corresponding to a minimum desired temperature setting of 70° F. (21.1° C.) produces six volts at the output terminal 128 of amplifier 40. Correspondingly, clockwise rotation of the potentiometer shaft to a position representing 107° F. (41.7° C.) results in zero volts at output terminal 128. Further clockwise rotation of the potentiometer shaft can produce no further decrease in the voltage at output terminal 128, and thus has the effect of limiting the maximum available temperature set point to 107° F. (41.7° C.). This maximum temperature value has been chosen to prevent physical injury to swimming pool or spa users which might occur from exposure to excessive water temperature.

The operation of the entire circuit 10 can now be summarized as follows. The user presets two desired temperature settings by means of the potentiometers 110 and 112. These settings might represent a high temperature mode for heating a spa, and a low temperature mode for heating a pool. The user then selects the desired mode by placing the switch 118 in either position 116 or 114. The selected preset potentiometer signal causes a voltage to appear at the inverting input terminal 58 of amplifier 38 which corresponds to the voltage which will appear at the noninverting input terminal 52 of amplifier 38 when the temperature of sensor 42 is at the desired preset temperature. Assume now that the water flowing through the heater is cooler than the temperature set point. In this condition the voltage at the inverting input terminal 58 is less than the voltage at the noninverting input terminal 52 of amplifier 38 which, as described heretofore, results in TRIAC 90 energizing the heater. Accordingly the water temperature increases, and this increase is sensed by the thermistor 42. When the temperature equals the temperature set point, the voltages at the input terminals 52 and 58 of the amplifier 38 are in balance and the heater is deenergized. The typical temperature differential for the control circuit 10 is 1.5° F. (0.83° C.) or less, as compared to 4° F. (2.2° C.) for prior art mechanical temperature controls.

Assume now that the temperature selector switch 118 is placed in the heater "off" position 120. The noninverting input terminal 126 of the amplifier 40 is raised to a highly positive voltage by a resistor 146 which is connected between the input terminal 126 and the twelve volt supply. This results in a voltage appearing at the inverting input terminal 58 of the amplifier 38 which corresponds to a temperature set point greatly below 70° F. (21.1° C.). The result is that the heater is turned off.

The temperature control circuit 10 of FIG. 1 includes a number of additional safety circuits to prevent the heater from being continuously energized in the event of a failure of the sensor 42, such as might occur in some heater control circuits if the sensor or any of its leads fail electrically. In the event of an open sensing circuit, the voltage at the terminal 44 attempts to rise toward the six volt supply through the series resistor 48. The voltage at the terminal 44 as mentioned heretofore is coupled to the noninverting input terminal 52 of the amplifier 38 by the resistor 50. This voltage at the input terminal 52 is clamped by diode 148 which is in turn connected to a voltage divider consisting of resistors 150 and 152. The values of the resistors 150 and 152 are chosen so that the voltage at the input terminal 52 is limited to a maximum of approximately 3.8 volts, which corresponds to a sensor 42 temperature below the lowest anticipated regulating temperature of 70° F. (21.1° C.). In addition, as the voltage at the terminal 44 attempts to rise due to a sensor failure, the base-emitter voltage of an NPN transistor 154 becomes forward biased by a resistor 156. The emitter and the collector of transistor 154 are connected to the inverting input terminal 58 of amplifier 38 and the six volt supply respectively, so that when the transistor 154 conducts, the voltage at input terminal 58 is raised to six volts. Accordingly, since the voltage at the input terminal 58 (six volts) exceeds the voltage at the input terminal 52 (three and eight tenths volts), the heater is deenergized resulting in a safe heater condition in the event of a sensor circuit failure.

As an additional safety feature, the circuit 10 is designed so that no single component failure results in a voltage in excess of fifteen volts or a current in excess of five milliamps appearing in the circuit of sensor 42. These values are chosen to prevent a serious shock hazard to the user in event of component failures. The current flowing through the sensor 42 is limited in the event of a failure by designing the circuit 10 to maximize the resistance of each of the resistors 48, 156, and 50 which are in series with the sensor 42. These resistors are chosen to be sufficiently high in resistance to limit the current through the sensor 42 to less than five milliamps at any achievable input supply voltage, regardless of a failure in the power supply circuit.

The voltage appearing at the sensor 42 is limited to a maximum of fifteen volts in the event of any single component failure in the following manner. The voltage to the sensor 42 is normally furnished by the six volt supply voltage appearing at the terminal 36. This voltage is limited by the zener diode 34. In the event of the zener diode 34 failing in an electrically open condition, the voltage at the terminal 36 is further limited to a voltage level less than 15 volts by a series of redundant voltage dividers which are a natural consequence of the bias networks used for the amplifier circuits described heretofore. Thus, the voltage of the terminal 36 is supplied from the 24 volt AC source at the terminal 12 through the resistor 24 in series with the parallel combination of the resistor 30 and the resistor 32. The voltage at the terminal 36 is held below 15 volts by the shunting effect of resistors connected between the terminal 36 and the power supply ground 22. These shunt resistors include the combination of the resistor 134 in series with the resistor 136, the resistor 150 in series with the resistor 152, and the two temperature setting potentiometers 110 and 112.

The circuit 10 as shown in FIG. 1 also includes certain filtering elements which were not mentioned in the above description of the circuit. Thus, capacitors 158, 160, 162, and 164 are all provided as bypass filters to eliminate transient noise from false triggering the circuit. A diode 166 is also provided between the load terminal 98 and the power supply ground 22 to clamp negative voltage transients which may be generated by the heater controller 94. The heater controller 94 is typically an inductive load such as a solenoid operated gas valve.

A typical control panel for use with the temperature control circuit 10 is shown in FIG. 2. This control panel is typically mounted to the heater enclosure. In this figure is shown a control panel 168 for mounting the three position temperature selecting switch 118 and the two temperature setting potentiometers 110 and 112. Each temperature setting potentiometer 110 and 112 may be provided with a graduated dial 170 and 172 respectively to indicate the minimum and maximum temperature settings. An additional feature may be added to mechanically limit the maximum temperature setting of the potentiometers 110 and 112 to a setting below the maximum of 107° F. (41.7° C.) provided by the circuit 10 as described heretofore. This mechanical temperature limit is implemented by using an adjustable mechanical stop 174. This stop 174 is formed of a thin metal disc rotatably mounted on the shaft of the potentiometer 110 underneath potentiometer knob 176. The stop 174 has an upstanding projection 178 which is designed to interfere with the rotation of the knob 176 and prevent further rotation. The position of the projection 178 is user adjusted by rotating the stop 174 and then tightening a locking screw 180 which is located within a slot 182 of the stop 174. Thus the knob 176 can be set at the highest desired temperature and the stop 174 rotated so that projection 178 just interferes with the knob 176. At this setting the screw 180 is tightened. The stop 174 now limits the maximum temperature that can be set. Of course, a similar adjustable mechanical stop can be provided for the potentiometer 112.

The circuit 10 of FIG. 1 is additionally provided with a connector 184 to permit connection of a remote control circuit such as shown in FIG. 3 for remote control of the temperature selecting switch function. A connector 184' shown in FIG. 3 is designed to mate with the connector 184 of FIG. 1, wherein connector terminals 186, 188, 190, 192, 194, and 196 mate with terminals 186', 188', 190', 192', 194', and 196' respectively. When connector 184' is mated with connector 184, and the switch 124 of the circuit 10 is placed in position 198, which is the remote control position, the operation of the circuit is as follows. By placing switch 124 in position 198, the temperature selector switch 118 of circuit 10 is disconnected and its function of selecting potentiometer 110 or 112 or the "off" position is now accomplished by a switch 200 in FIG. 3 which may be remotely located from the heater. In addition, a light emitting diode 202 is provided at the remote location to give a visual indication of when the heater is energized. The light emitting diode 202 is connected through terminals 186, 186', 196, and 196' and by series current limiting resistor 204 to the output terminal 60 of the amplifier 38. When the output terminal 60 switches to a positive voltage, which is the condition when the heater is energized, a current is supplied through the resistor 204 to light the diode 202 as a heater "on" indication. When the output terminal 60 of the amplifier 38 switches to a low voltage condition, which is heater "off," the diode 202 is extinguished. A typical mounting panel 206 for the remote control circuit of FIG. 3 is shown in FIG. 4, and includes provisions for mounting the remote temperature selecting switch 200 and the light emitting diode 202.

An alternative remote control circuit is shown in FIG. 5. This circuit includes not only the remote control of the temperature selecting switch function but also remote control of the functions of the temperature setting potentiometers. In a manner analogous to the discussion of the circuit of FIG. 3, connector 184″ of FIG. 5 is provided to mate with the connector 184 of FIG. 1. By placing the switch 124 in the remote control position 198, the circuit of FIG. 5 replaces the functions of the switch 118 and the potentiometers 110 and 112 of circuit 10. Referring to FIG. 5, a switch 218 performs the temperature selecting function between potentiometer 228 and potentiometer 230 which are used as described heretofore for setting two preset temperatures. Light emitting diode 232 is included to act as a heater status indicator in a manner analogous to the diode 202 of FIG. 3. A typical control panel for the circuit of FIG. 5 would be similar to the panel 168 as shown in FIG. 2, with the addition of the light emitting diode 232. It should be noted that the function of switch 124 described above may be accomplished by the proper placement of a jumper wire in the circuit 10, as opposed to the use of an actual switch.

In a preferred embodiment of the invention shown in FIG. 1, components of the following values may be used:

| REFERENCE DESIGNATION | VALUE |
| --- | --- |
| 20 | 1N4001 |
| 24 | 220 Ohms |
| 26 | 220 Microfarads |
| 30, 32 | 620 Ohms |
| 34 | 1N5232 |
| 38, 40 | LM2904, National Semiconductor |
| 48 | 8.25 Kilohms |
| 50, 92, 156 | 10.0 Kilohms |
| 62 | 2.7 Megohms |
| 64, 68 | MPSA05, Motorola Semiconductor |
| 66 | 15 Kilohms |
| 72, 74, 76, 78, 80, 148, 166 | 1N914 |
| 90 | Q2010L4, Teccor Electronics |
| 100 | 240 Ohms |
| 104 | 100 Ohms |
| 106 | 0.05 Microfarads |
| 108 | 2.2 Kilohms |
| 110, 112 | 10 Kilohm Potentiometers |
| 130 | 1.0 Kilohm |
| 132 | 43.2 Kilohms |
| 134 | 26.1 Kilohms |
| 136 | 23.7 Kilohms |
| 138 | 14.7 Kilohms |
| 140 | 7.15 Kilohms |
| 142 | 91 Kilohms |
| 146 | 1.0 Megohms |
| 150 | 2.7 Kilohms |
| 152 | 3.9 Kilohms |
| 154 | MPS5172, Motorola Semiconductor |
| 158, 160, 162, 164 | 0.1 Microfarads |

While the invention as disclosed and a particular embodiment is described in detail, it is not intended that the invention be limited solely to this embodiment. Many modifications will occur to those skilled in the art which are within the spirit and scope of the invention. It is thus intended that the invention be limited in scope only by the appended claims.

What is claimed is:

1. An electronic temperature control for use with swimming pool and spa water heaters comprising:
   means for sensing the temperature of the water to be heated, including a thermistor;
   means for generating a first electrical signal proportional to the sensed temperature;
   means for generating a second electrical signal which increases in proportion to a decrease in a desired water temperature setting;
   means for comparing the sensed temperature with the desired temperature setting by electronically comparing the first electrical signal with the second electrical signal; and
   an operational amplifier positively responsive to the second electrical signal and negatively responsive to a fixed bias signal corresponding to the predetermined maximum water temperature, whereby the output signal of the operational amplifier is proportional to the desired water temperature setting, and the output signal is further limited by the fixed bias signal to the signal lever corresponding to the predetermined maximum water temperature.

2. An electronic temperature control for use with swimming pool and spa water heaters comprising:
   means for sensing the temperature of the water to be heated;
   means for generating a second electrical signal proportional to the sensed temperature;
   means for generating a second electrical signal proportional to a desired water temperature setting;
   means for comparing the sensed temperature with the desired temperature setting by electronically comparing the first electrical signal with the second electrical signal;
   means for energizing the heater when the sensed temperature is less than the desired temperature setting as determined by comparing the first electrical signal with the second electrical signal;
   means for deenergizing the heater in the event of an open temperature sensing circuit, including an operational amplifier having a positive input responsive to the first electrical signal and having a negative input responsive to the second electrical signal, means for clamping the positive input signal to a fixed level corresponding to a predetermined minimum water temperature in the event of an open temperature sensing circuit, and means for biasing the negative input signal to a level corresponding to a water temperature greater than the minimum water temperature in the event of an open temperature sensing circuit.

* * * * *